US012679233B2

(12) United States Patent
Beierl

(10) Patent No.: US 12,679,233 B2
(45) Date of Patent: Jul. 14, 2026

(54) CHARGING SOCKET MODULE

(71) Applicant: Dr. Ing. h.c. F. Porsche Aktiengesellschaft, Stuttgart (DE)

(72) Inventor: Dominik Beierl, Korntal-Münchingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 380 days.

(21) Appl. No.: 18/514,311

(22) Filed: Nov. 20, 2023

(65) Prior Publication Data

US 2024/0166063 A1 May 23, 2024

(30) Foreign Application Priority Data

Nov. 23, 2022 (DE) ..................... 10 2022 130 949.5

(51) Int. Cl.
*H01R 13/00* (2006.01)
*B60L 53/16* (2019.01)

(52) U.S. Cl.
CPC .................................... *B60L 53/16* (2019.02)

(58) Field of Classification Search
CPC .............................. B60L 53/16; H01R 13/627
See application file for complete search history.

(56) References Cited

U.S. PATENT DOCUMENTS 10,179,517 B2 * 1/2019 Toth ..................... H01R 13/514
2012/0047971 A1 * 3/2012 Katagiri .................. B60L 50/16
70/58

2013/0224969 A1 * 8/2013 Sasaki .................... H01R 31/06
439/34
2013/0326955 A1 * 12/2013 Kotama .................. E05F 15/40
49/13
2015/0104961 A1 * 4/2015 Bito ........................ B60K 15/05
439/142
2018/0141448 A1 * 5/2018 Kupfer ................... H01R 13/71
2021/0143598 A1 * 5/2021 Salabai .................. B60R 16/02
2021/0213828 A1 * 7/2021 Daiminger .............. E05F 15/73
2021/0265764 A1 * 8/2021 Hachadorian ...... H01R 13/5213
2022/0134873 A1 * 5/2022 Beck ...................... B60K 15/05
296/97.22

FOREIGN PATENT DOCUMENTS

DE 102011001034 A1 9/2012
DE 102017222572 A1 6/2019

* cited by examiner

*Primary Examiner* — Abdullah A Riyami
*Assistant Examiner* — Nelson R. Burgos-Guntin
(74) *Attorney, Agent, or Firm* — Buchanan Ingersoll & Rooney PC

(57) ABSTRACT

A charging socket module for a motor vehicle includes a body having a charging socket and a charging socket cover. The charging socket module is arranged on the body of the motor vehicle in the region of an opening of the body. The charging socket is displaceably mounted on the body, wherein the displaceable arrangement of the charging socket is provided adjacent the opening of the body. The charging socket cover is arranged to be displaceable relative to the body in the region of the opening of the body. An electrical supply element is arranged adjacent the charging socket, wherein the charging socket includes an electrical plug connector for electrically connecting the charging socket to the supply element and/or sliding contact elements and/or jaw contact elements for electrically connecting the charging socket to the supply element.

15 Claims, 4 Drawing Sheets

CHARGING SOCKET MODULE

CROSS-REFERENCE TO RELATED APPLICATION

This application claims priority to German Patent Application No. 10 2022 130 949.5, filed Nov. 23, 2022, the content of such application being incorporated by reference herein in its entirety.

FIELD OF THE INVENTION

The invention relates to a charging socket module for a motor vehicle.

BACKGROUND OF THE INVENTION

Motor vehicles that are driven at least semi-electrically or entirely electrically are known in the prior art. Such motor vehicles comprise at least one electrical energy storage device and at least one electric drive motor, which is fed from the electrical energy storage device for driving the motor vehicle.

To charge the electrical energy storage device, such motor vehicles comprise a charging socket. The charging socket is used to electrically connect the at least one electrical energy storage device to an external power supply. For example, a connection of the electrical energy storage device of the motor vehicle to an external power supply can be established by means of a charging cable, which can be inserted into the charging socket.

In such motor vehicles from the prior art, the charging socket is arranged such that it is mounted in the vehicle body in a positionally fixed manner, a charging socket flap being provided in front of the charging socket, which protects the charging socket against external environmental influences. The charging socket flap typically terminates outwardly flush with the vehicle body, and the charging socket is rearwardly offset behind the charging socket flap in order to provide the charging socket flap sufficient space for covering and releasing the charging socket.

Displacing the charging socket into the vehicle body generates an increased need for design space and, at the same time, the plugging of the charging cable is not satisfactory with regard to ergonomics. Secure covering of the charging socket is also desirable in order to protect the charging socket.

SUMMARY OF THE INVENTION

One exemplary embodiment of the invention relates to a charging socket module for a motor vehicle with a body, having a charging socket and a charging socket cover, wherein the charging socket module is arranged on the body of the motor vehicle in the region of an opening of the body, wherein the charging socket is displaceably mounted on the body, wherein the displaceable arrangement of the charging socket is provided adjacent the opening of the body and the charging socket cover is arranged such to be displaceable relative to the body in the region of the opening of the body, wherein an electrical supply element is arranged adjacent the charging socket, wherein the charging socket comprises an electrical plug connector for electrically connecting the charging socket to the supply element and/or sliding contact elements and/or jaw contact elements for electrically connecting the charging socket to the supply element. As a result, the charging socket can be protected by the charging socket cover on the one hand, and an ergonomically favorable arrangement of the charging socket can be provide on the other hand when the charging socket is to be used for charging. At the same time, the required design space can be optimized. Moreover, the electrical connection between the charging socket and the electrical circuit of the motor vehicle can be achieved, in particular when the electrical connection between the plug connector and the supply element can be provided as needed.

In one exemplary embodiment, it is advantageous when, in a first operating position, the charging socket cover closes the opening of the body and, in a second operating position, it exposes the opening of the body, the charging socket cover being mounted to be displaceable between the first operating position and the second operating position. As a result, on the one hand, the charging socket can be protected against external influences when not in use and, on the other hand, the charging socket can be made accessible for use without foregoing the safety desired in the case of non-use. A secure sealing can also be ensured, because the displacement of the charging socket cover can be designed accordingly.

It is also advantageous when the charging socket cover is designed and mounted as a charging socket flap and performs a pivoting movement between the first operating position and the second operating position. The charging socket cover can thus certainly perform a complex trajectory in the pivoting movement in order to expose the charging socket, which also supports the displaceability of the charging socket, because required design space, which would otherwise be occupied by the charging socket cover, is freed for this purpose.

Also, it is advantageous when, in the second operating position, the charging socket cover is arranged above, below, or adjacent the charging socket. Doing so enables the displaceability of the charging socket, because the charging socket cover can be pivoted to a location where it cannot collide with the charging socket.

It is particularly advantageous when, in its first operating position, in particular in the first operating position of the charging socket cover, the charging socket is arranged behind the charging socket cover and rearwardly displaced from the opening of the body and, in its second operating position, in particular in the second operating position of the charging socket cover, the charging socket is arranged in a location that is forwardly displaced towards the opening of the body, wherein the charging socket is mounted such that it can be displaced between its first operating position and its second operating position. As a result, in its first operating position, the charging socket frees up space for displacement of the charging socket cover in order to close the opening of the body, wherein, in the open state of the opening of the body, the accessibility to the charging socket and the ergonomics are improved by the forward displacement of the charging socket.

It is also advantageous when, in its second operating position, the charging socket is arranged substantially flush with the body outer shell and/or in the opening of the body. Beneficial accessibility of the charging socket is thus achieved, in particular when the charging socket is arranged substantially flush with the body outer shell, or even possibly projects outwardly or is recessed only slightly inwardly.

It is also advantageous when the charging socket cover is mounted in the housing and/or in the body to be displaceable by means of a lever arrangement and/or that the charging socket is mounted in the housing and/or in the body to be displaceable by means of a lever arrangement. As a result, a complex trajectory of the pivoting of the charging socket cover and/or the charging socket can also be achieved in order to improve accessibility.

It is particularly advantageous when at least one actuator is provided for the displacement of the charging socket cover and/or the charging socket. An automated actuation and displacement can thus be performed. At least one electrical actuator is advantageous for displacement of the charging socket cover and the charging socket, or two electrical actuators for displacement of the charging socket cover with one actuator and the charging socket with a second actuator.

For example, it is advantageous when, in the first operating position of the charging socket, the electrical supply element and the electrical plug connector are electrically isolated from one another and, in the second operating position of the charging socket, the electrical supply element and the electrical plug connector are electrically connected to one another such that, when the charging socket is transitioned from its first operating position into its second operating position, an electrical contact is established between the plug connector and the supply element. The electrical connection between the charging socket and the electric circuit of the motor vehicle can therefore be achieved when charging using the charging socket is enabled.

Also, it is advantageous when the electrical supply element is electrically connected to a solid busbar. Doing so enables high currents to be connected and transmitted even at high voltages.

BRIEF DESCRIPTION OF THE DRAWINGS

The invention is described in detail below on the basis of exemplary embodiments with reference to the drawings. The drawings show.

DETAILED DESCRIPTION OF THE INVENTION

FIGS. 1 to 14 show exemplary embodiments of a charging socket module 1, as can be used for example in a motor vehicle 2 with an electrically driven drive system and an electrical energy storage device, in order to be able to perform electrical charging of an electrical energy storage device via a connection, e.g. in a charging network. The charging socket module 1 can be inserted in the body 3 of the motor vehicle 2 so that it can be hidden behind a body outer shell.

Figure 13:
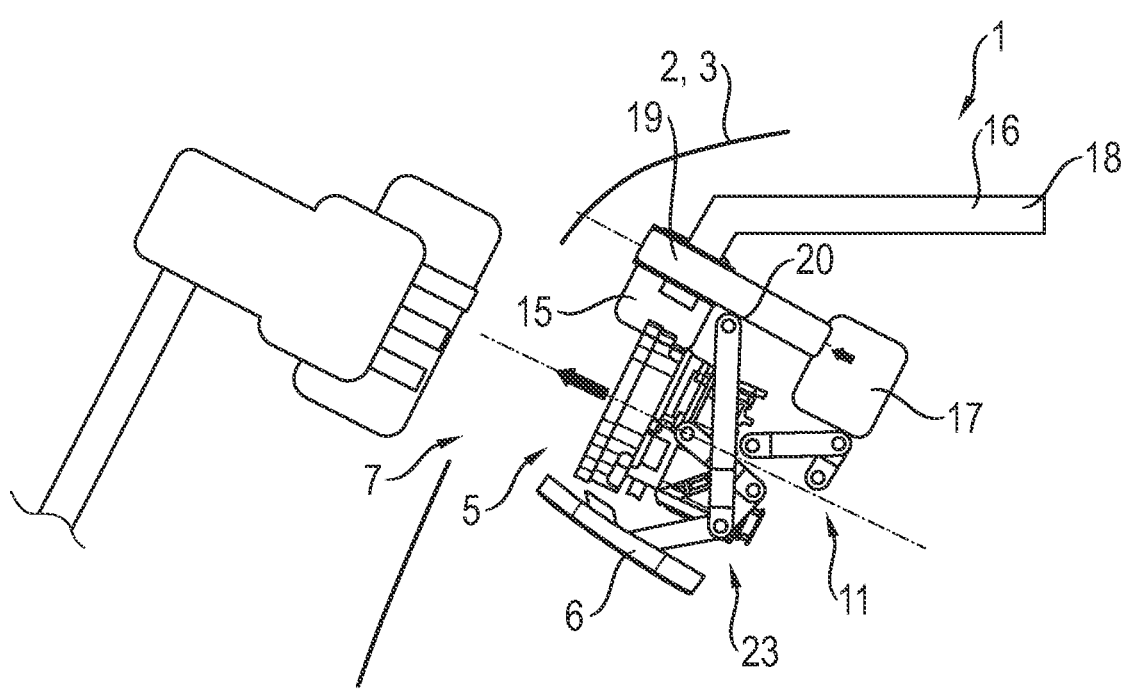
FIG. 13 depicts a schematic sectional view of a portion of a body of a motor vehicle having an alternative charging socket, whereby an alternative electrical connection of the charging socket is provided.
Figure 14:
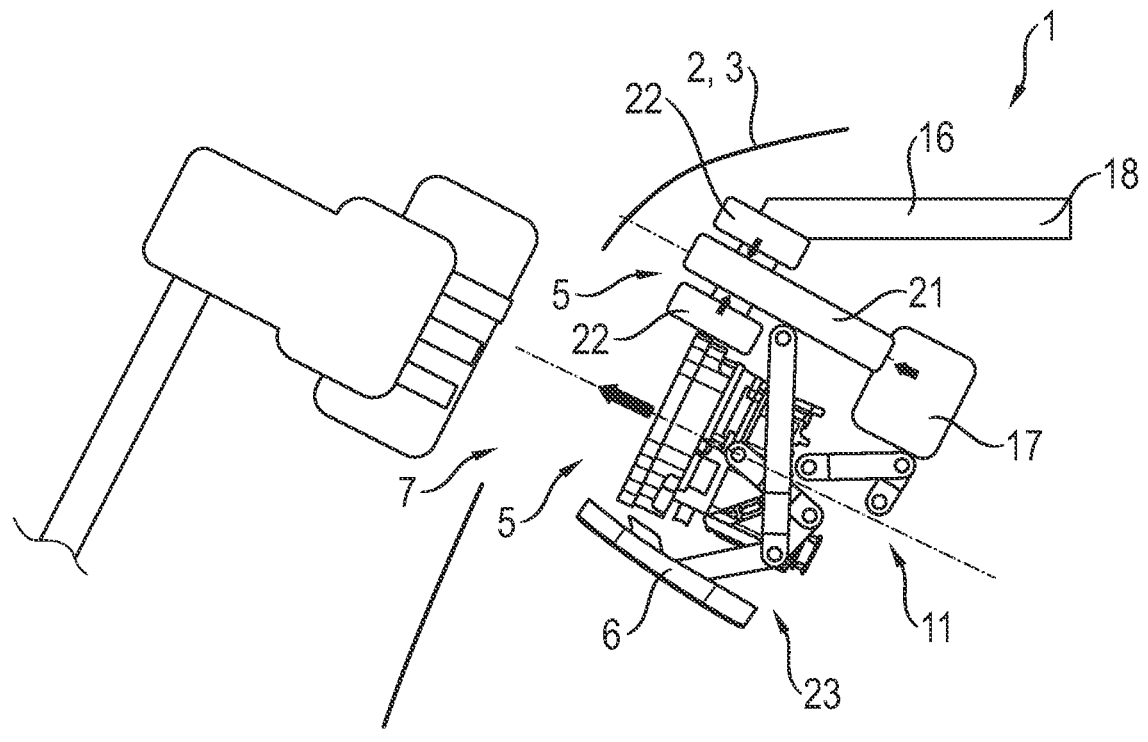
FIG. 14 depicts a schematic sectional view of a portion of a body of a motor vehicle having a further alternative charging socket, whereby an alternative electrical connection of the charging socket is again provided.

FIGS. 1 to 12 show a first embodiment of a charging socket module 1 in various views and in various operating states. FIGS. 13 to 15 show further alternative exemplary embodiments of the charging socket module 1.

The charging socket module 1 is, for example, a charging socket module for a motor vehicle 2 having a body 3. The charging socket module 1 comprises a housing 4 in which a charging socket 5 and a charging socket cover 6 are arranged, the charging socket module 1 being arranged on the body 3 of the motor vehicle 2 in the region of an opening 7 in the body 3.

FIGS. 1 to 4 show the charging socket module 1 or portions thereof in an operating state in which the opening 7 in the body 3 is closed by the charging socket cover 6.

FIGS. 5 to 8 show the charging socket module 1 or portions thereof in an operating state in which the opening 7 in the body 3 is exposed by the charging socket cover 6 and the charging socket 5 is rearwardly displaced in order to ensure sufficient space for the pivoting or displacement of the charging socket cover 6.

FIGS. 9 to 12 show the charging socket module 1 or portions thereof in an operating state in which the opening 7 in the body 3 is exposed by the charging socket cover 6 and the charging socket 5 is forwardly displaced in order to be able to achieve an ergonomically favorable connection of the charging socket 5.

FIGS. 1 to 12 show that the charging socket module 1 is or can be arranged on the body 3 of the motor vehicle 2 in the region of an opening 7 of the body 3, wherein the charging socket 5 can be mounted arranged to be displaceable on the body 3. The displaceable charging socket 5 is correspondingly arranged, e.g., to be displaceable in the housing 4, wherein the housing 4 can, e.g., be fixedly arranged in the body 3.

In the exemplary embodiment shown, the displaceable arrangement of the charging socket 5 is provided adjacent the opening 7 of the body 3. Furthermore, the charging socket cover 6 is also arranged to be displaceable relative to the body 3 in the region of the opening 7 of the body 3. The displaceable charging socket cover 6 is correspondingly arranged, e.g., to be displaceable in the housing 4, in which case the housing 4 can, e.g., be fixedly arranged in the body 3.

FIGS. 1 to 4 show that, in a first operating position, the charging socket cover 6 closes the opening 7 of the body 3 and, in a second operating position (see FIGS. 5 to 12), it exposes the opening 7 of the body 3, wherein the charging socket cover 6 is mounted such that it can be displaced between the first operating position and the second operating position.

Given that the charging socket cover 6 is arranged to be displaceable in the housing 4 and because the housing 4 can also have an opening 8, then, in the first operating position, the charging socket cover 6 would close the opening 7 of the body 3 and the opening 8 of the housing 4 and, in a second operating position, the displaced charging socket cover would expose the opening 7 of the body 3 and the opening 8 of the housing 4, wherein the charging socket cover 6 is mounted such that it can be displaced between the first operating position and the second operating position.

FIGS. 1 to 12 also show that, in the exemplary embodiment shown, the charging socket cover 6 is designed and mounted as a pivotable charging socket flap and is pivotably mounted such that it performs a pivoting movement between the first operating position and the second operating position. The result of this pivoting of the charging socket flap is that, in the first operating position, the charging socket cover 6 is arranged in front of the charging socket 5 and in the opening 7 and closes it, and, after the pivoting of the charging socket cover 6, the charging socket cover 6 is no longer arranged in front of the charging socket 5, but rather provides access to the charging socket 5.

In the exemplary embodiment shown, the charging socket cover 6 is arranged below the charging socket 5 in the second operating position. Alternatively, the charging socket flap 6 could also be arranged above or adjacent the charging socket 5, see in particular FIGS. 7, 8, 11, and 12.

Furthermore, the charging socket 5 is also designed to be displaceably mounted. For example, the charging socket 5 displaceable between a first operating position and a second operating position.

Figures 1, 2, 3, 4:
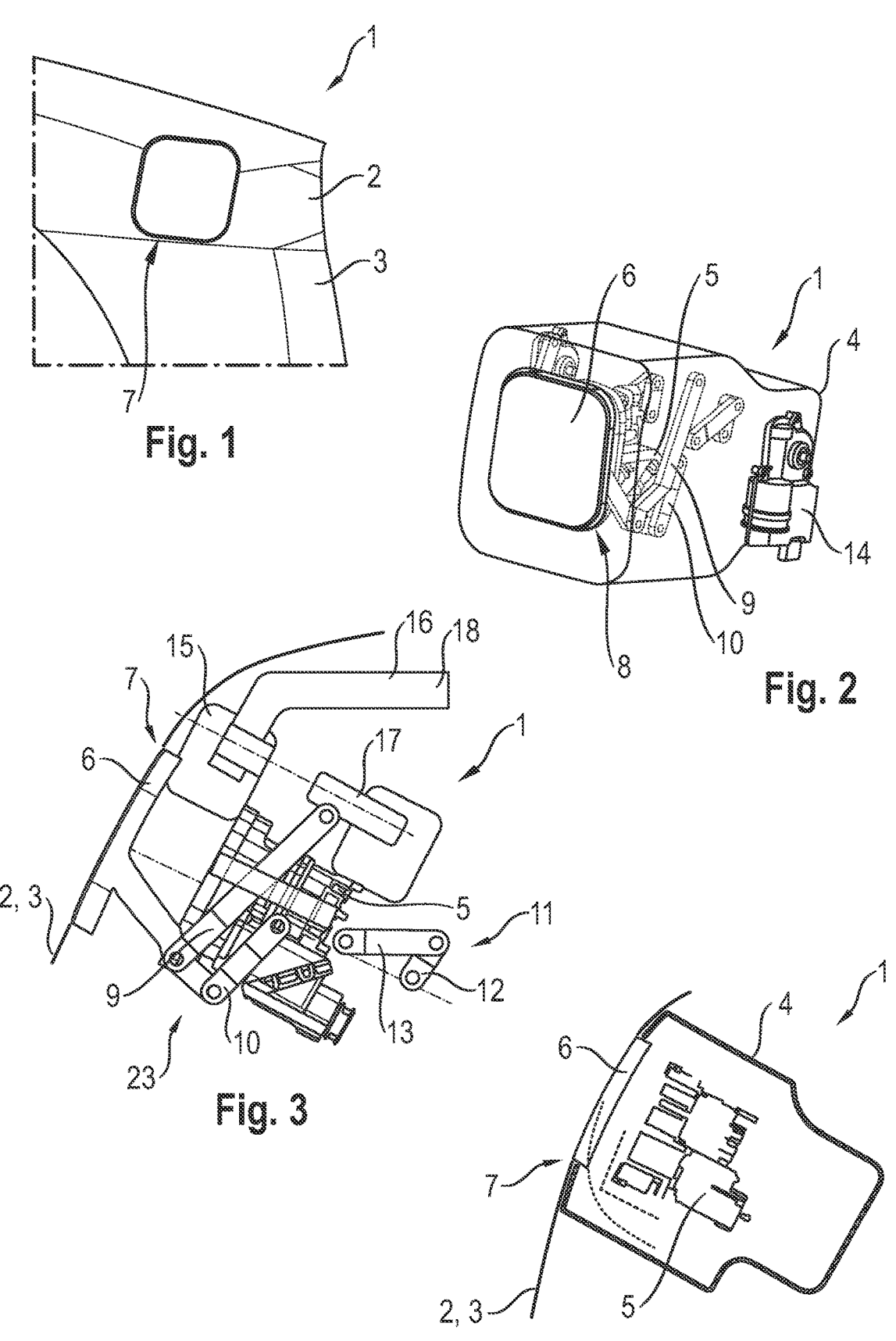
FIG. 1 depicts a schematic perspective view of a portion of a body of a motor vehicle having a charging socket hidden behind a charging socket cover, wherein the charging socket cover closes an opening in the body in which the charging socket is rearwardly displaced.
FIG. 2 depicts a schematic perspective view of a portion of a body of a motor vehicle having a charging socket module with a charging socket hidden behind a charging socket cover, the charging socket cover closing an opening in the body in which the charging socket is rearwardly displaced, as shown in FIG. 1.
FIG. 3 depicts a schematic sectional view of a portion of a body of a motor vehicle having a charging socket hidden behind a charging socket cover, whereby the charging socket cover closes an opening in the body in which the charging socket is rearwardly displaced, as shown in FIGS. 1 and 2.
FIG. 4 depicts a further schematic sectional view of a portion of a body of a motor vehicle having a charging socket hidden behind a charging socket cover, wherein the charging socket cover closes an opening in the body in which the charging socket is rearwardly displaced, as shown in FIGS. 1, 2, and 3.
Figures 5, 6, 7, 8:
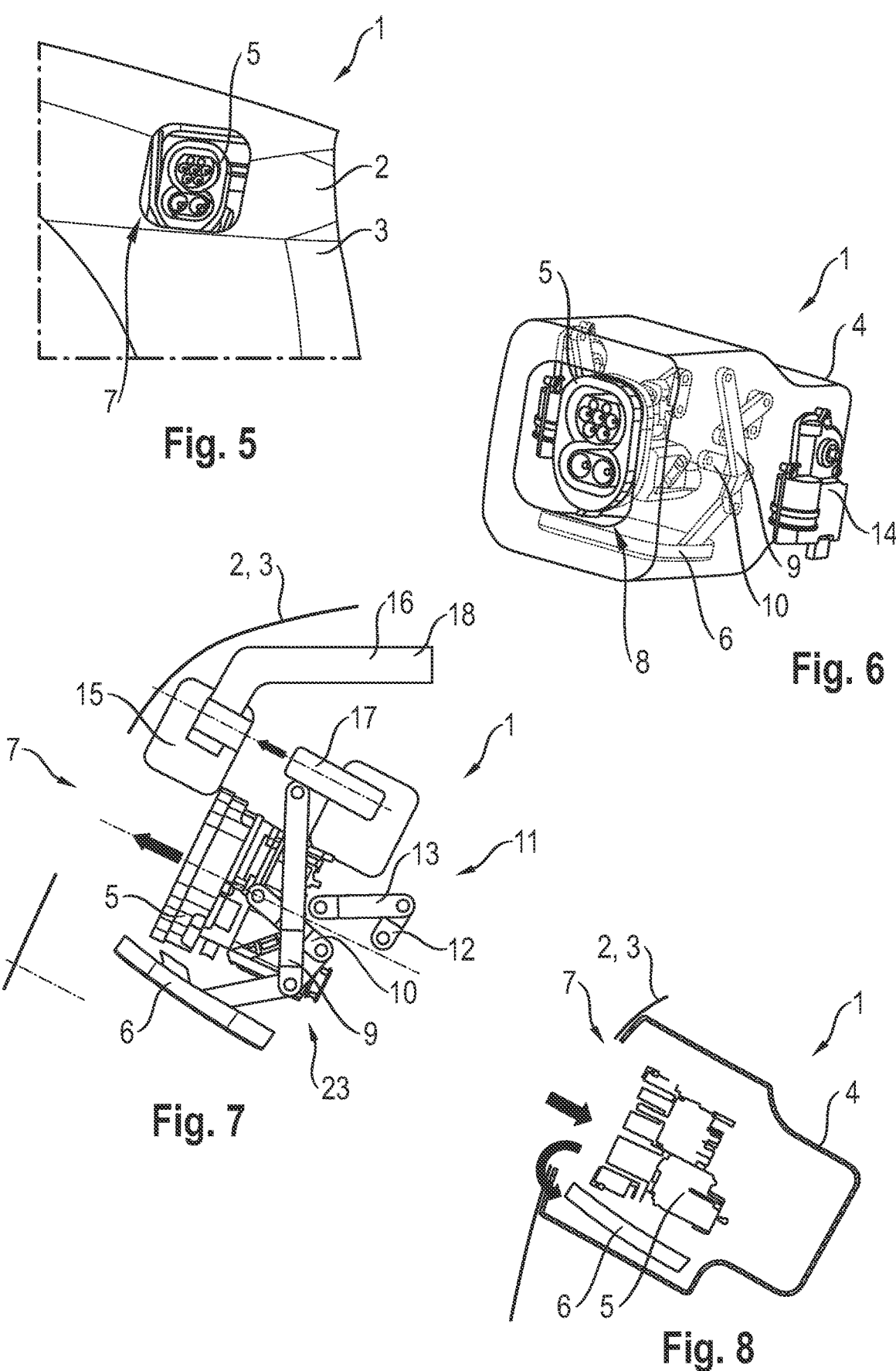
FIG. 5 depicts a schematic perspective view of a portion of a body of a motor vehicle having a charging socket rearwardly displaced in an opening, wherein the charging socket cover has exposed the opening in the body.
FIG. 6 depicts a schematic perspective view of a portion of a body of a motor vehicle having a charging socket module with a charging socket rearwardly displaced in an opening, wherein the charging socket cover has exposed the opening in the body by pivoting, as shown in FIG. 5.
FIG. 7 depicts a schematic sectional view of a portion of a body of a motor vehicle having a charging socket rearwardly displaced in an opening, wherein the charging socket cover has exposed the opening in the body by pivoting, as shown in FIGS. 5 and 6.
FIG. 8 depicts a further schematic sectional view of a portion of a body of a motor vehicle having a charging socket rearwardly displaced in an opening, the charging socket cover having exposed the opening in the body by pivoting, as shown in FIGS. 5, 6, and 7.

In its first operating position, the charging socket 5 is arranged behind the charging socket cover 6 and is rearwardly displaced from the opening 7 of the body 3, see for example FIG. 3 or FIG. 7. This operating position of the charging socket 5 is adopted in particular in the first operating position of the charging socket cover 6 and when the charging socket cover 6 is displaced. This operating position of the charging socket 5 serves to free the space for the displacement of the charging socket cover 6.

Figures 9, 10, 11, 12:
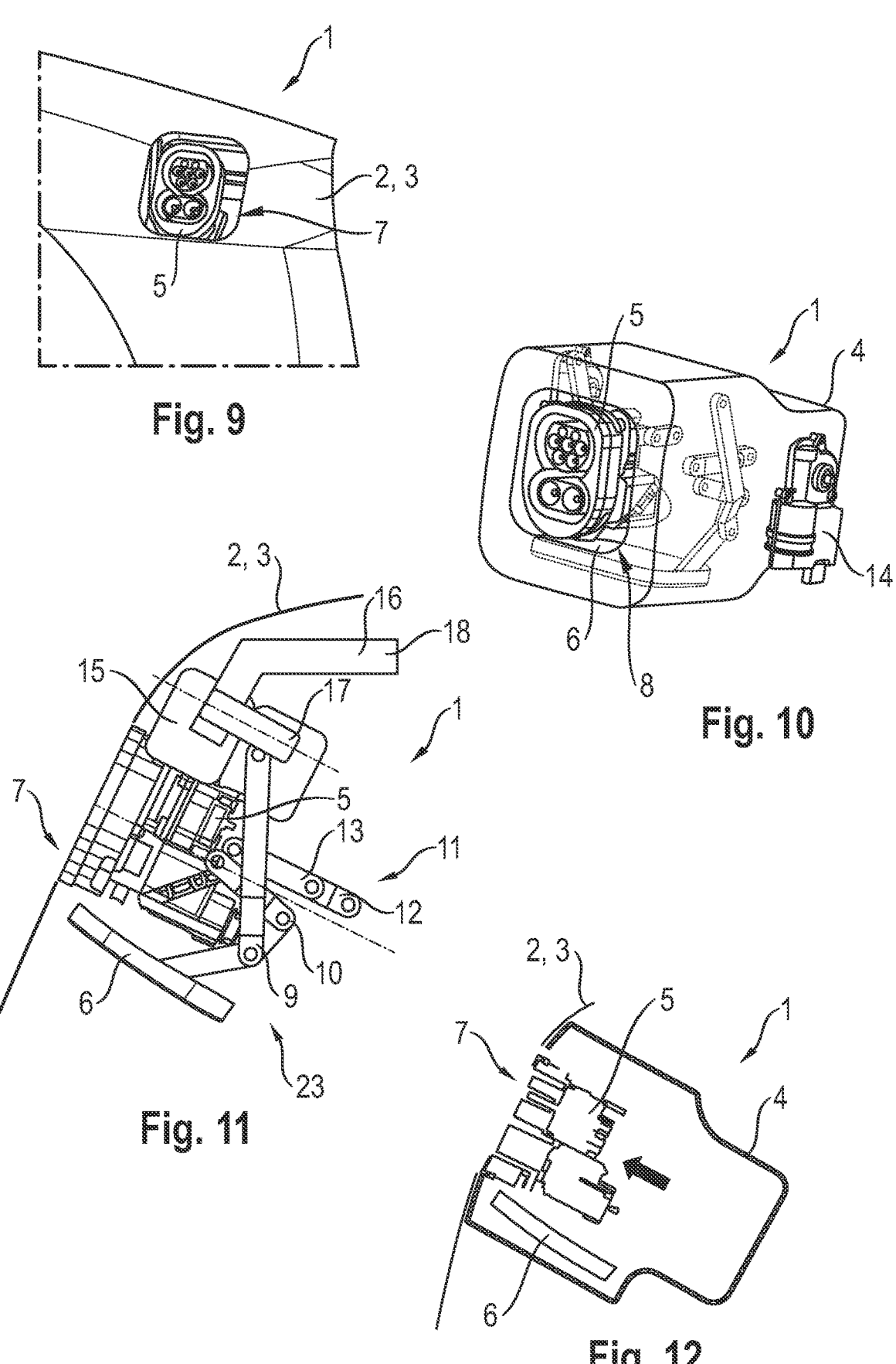
FIG. 9 depicts a schematic perspective view of a portion of a body of a motor vehicle having a charging socket forwardly displaced and arranged flush in an opening in the body, the charging socket cover being pivoted in order to expose the opening.
FIG. 10 depicts a schematic perspective view of a portion of a body of a motor vehicle having a charging socket module with a charging socket forwardly displaced and arranged flush in an opening in the body, the charging socket cover being pivoted in order to expose the opening, as shown in FIG. 9.
FIG. 11 depicts a schematic sectional view of a portion of a body of a motor vehicle having a charging socket forwardly displaced and arranged flush in an opening in the body, the charging socket cover being pivoted in order to expose the opening, as shown in FIGS. 9 and 10.
FIG. 12 depicts a further schematic sectional view of a portion of a body of a motor vehicle having a charging socket forwardly displaced and arranged flush in an opening in the body, the charging socket cover being pivoted in order to expose the opening, as shown in FIGS. 9, 10, and 11.

In its second operating position, which can be adopted when the charging socket cover 6 is also arranged in its second operating position, the charging socket 5 is arranged in a position that is forwardly displaced towards the opening 7 of the body 3 (see, e.g. FIG. 11. In the second operating position, the charging socket 5 is displaced towards the opening 7 and provides beneficial ergonomics for attachment to the charging socket 5.

In the exemplary embodiment shown, the charging socket 5, in its second operating position, is arranged substantially flush with the body outer shell and/or in the opening 7 of the body 3, as can be seen in FIGS. 10 and 11.

The displacement of the charging socket cover 6 is performed by means of a lever arrangement 23 relative to the body 3 or in the body 3 and/or in the housing 4 or to the housing 4. The lever arrangement 23 comprises two levers 9, 10, which are hingedly connected to the housing 4 and to the charging socket cover 6.

The displacement of the charging socket 5 takes place in the housing 4 and/or in the body 3 by means of a lever arrangement 11. The lever arrangement 11 comprises two levers 12, 13, which are hingedly connected to the housing 4 and to the charging socket 5, e.g. by means of knee levers.

At least one actuator 14 is provided for relocating the charging socket 5 and/or the charging socket cover 6. The at least one actuator 14, or optionally also two actuators 14, is/are advantageously arranged on the outside of the housing 4 and pivot(s) the levers 9, 10, 12, 13 of the respective lever arrangement 23, 11. The respective lever arrangement 23, 11 can be, e.g., a knee lever arrangement.

In the exemplary embodiment of FIGS. 1 to 12, an electrical supply element 15 is arranged adjacent the displaceable charging socket 5 and in a positionally fixed manner compared thereto. This supply element 15 is used to supply electrical power to the onboard power system and the electric power elements of the motor vehicle when the charging socket 5 is connected to a charging network. The supply element 15 is connected to a fixed lead 16, e.g., as a solid busbar 18 having a cross-section of, e.g., 150 mm² or more, in particular 200 mm². The supply element 15 is designed in the form of a female plug element.

The charging socket 5 comprises an electrical plug connector 17, e.g. as a male plug element, for electrically connecting the charging socket 5 to the supply element 15. The plug contact between the supply element 15 and the plug connector 17 is not established until the charging socket 5 is displaced from its first operating position into its second operating position (see FIG. 11). For example, the plug connector 17 is also solidly formed with a cross-section substantially similar or equal to the cross-section of the fixed lead 16 or the busbar 18.

In the first operating position of the charging socket 5, the electrical supply element 15 and the electrical plug connector 17 are electrically isolated from one another and, in the second operating position of the charging socket 5, the electrical supply element 15 and the electrical plug connector 17 are electrically connected to one another such that, when the charging socket 5 is transitioned from its first operating position into its second operating position, an electrical contact is established between the plug connector 17 and the supply element 15.

FIGS. 13 and 14 show further exemplary embodiments according to aspects of the invention of charging socket modules 1, which differ in terms of the electrical connection of the charging socket to the onboard power system and to the electrical power elements of the motor vehicle.

As shown in FIG. 13, the charging socket 5 is connected to the electrical supply element 15 via a sliding contact 19, whereby a sliding contact element 20 projects off of the plug connector 17 and is in sliding contact with the supply element 15, even when the charging socket 5 is displaced. The plug connector 17 is electrically connected to the charging socket 5, and the electrical supply element 15 is connected to the fixed lead 16 or the busbar 18 of the onboard power system. For example, the sliding contact element 20 is also solidly formed with a cross-section substantially similar or equal to the cross-section of the fixed lead 16 or the busbar 18.

As shown in FIG. 14, the charging socket 5 is connected to the electrical supply element 15 via a jaw contact, in which case two jaw contact elements 22 are arranged on the supply element 15 and one contact element 21 projects off of the plug connector 17, which can be clamped and contacted by the jaw contact elements 22. The plug connector 17 is electrically connected to the charging socket 5, and the electrical supply element 15 is connected to the fixed lead 16 of the onboard power system. For example, the plug connector 17 is also solidly formed with a cross-section substantially similar or equal to the cross-section of the fixed lead 16 or the busbar 18.

LIST OF REFERENCE CHARACTERS

1 Charging socket module
2 Motor vehicle
3 Body
4 Housing
5 Charging socket
6 Charging socket cover
7 Opening
8 Opening
9 Lever
10 Lever
11 Lever arrangement
12 Lever
13 Lever
14 Actuator
15 Supply element
16 Fixed lead
17 Plug connector
18 Busbar
19 Sliding contact
20 Sliding contact element
21 Contact element
22 Jaw contact element
23 Lever arrangement

What is claimed is:

1. A charging socket module for a body of a motor vehicle, wherein the charging socket module is configured to be displaceably mounted on the body of the motor vehicle in a region of an opening in the body, said charging socket module comprising:
a charging socket and a charging socket cover, wherein the charging socket cover is displaceable relative to the body in the region of the opening of the body, and wherein the charging socket is also displaceable relative to the body in the region of the opening of the body, and wherein the charging socket is configured to releasably receive a charging plug, and
an electrical supply element disposed adjacent the charging socket,
wherein the charging socket comprises (i) an electrical plug connector for electrically connecting the charging socket to the electrical supply element, and/or (ii) sliding contact elements for electrically connecting the charging socket to the electrical supply element, and/or (iii) jaw contact elements for electrically connecting the charging socket to the electrical supply element.

2. The charging socket module according to claim 1, wherein, in a first operating position, the charging socket cover closes the opening of the body and, in a second operating position, the charging socket cover exposes the opening of the body, wherein the charging socket cover is displaceably mounted between the first operating position and the second operating position.

3. The charging socket module according to claim 2, wherein the charging socket cover is configured and mounted as a charging socket flap and is configured to perform a pivoting movement between the first operating position and the second operating position.

4. The charging socket module according to claim 2, wherein, in the second operating position, the charging socket cover is arranged above, below, or adjacent the charging socket.

5. The charging socket module according to claim 2, wherein, in the first operating position of the charging socket cover, the charging socket is arranged behind the charging socket cover and rearwardly displaced from the opening of the body, and, in the second operating position of the charging socket cover, the charging socket is arranged in a position that is forwardly displaced towards the opening of the body, wherein the charging socket is mounted to be displaceable between the first operating position and the second operating position.

6. The charging socket module according to claim 5, wherein, in the second operating position, the charging socket is arranged substantially flush with the body outer shell and/or in the opening of the body.

7. The charging socket module according to claim 1, wherein the charging socket cover is mounted in the housing and/or in the body to be displaceable by way of a lever arrangement and/or the charging socket is mounted in the housing and/or in the body to be displaceable by way of the lever arrangement.

8. The charging socket module according to claim 1, wherein at least one actuator is provided for displacing the charging socket cover and/or the charging socket.

9. The charging socket module according to claim 1, wherein, in a first operating position of the charging socket, the electrical supply element and the electrical plug connector are electrically isolated from one another, and, in a second operating position of the charging socket, the electrical supply element and the electrical plug connector are electrically connected to one another such that, when the charging socket is transitioned from the first operating position into the second operating position, an electrical contact is established between the plug connector and the supply element.

10. The charging socket module according to claim 1, wherein the electrical supply element is electrically connected to a solid busbar.

11. A motor vehicle body comprising the charging socket module of claim 1.

12. A motor vehicle comprising the motor vehicle body of claim 11.

13. The charging socket module according to claim 6, wherein, in the first operating position, the charging socket is recessed within the body outer shell and/or in the opening of the body.

14. The charging socket module according to claim 1, wherein (i) the charging socket cover is mounted in the housing and/or in the body to be displaceable by way of a lever arrangement and (ii) the charging socket is mounted in the housing and/or in the body to be displaceable by way of the lever arrangement.

15. The charging socket module according to claim 1, wherein at least one actuator is provided for displacing the charging socket cover and the charging socket.

*     *     *     *     *